United States Patent
Ozawa

(10) Patent No.: US 6,572,188 B2
(45) Date of Patent: Jun. 3, 2003

(54) ARRANGEMENT FOR SUPPORTING ROTATION ADJUSTMENT MECHANISM OF ROTARY BODY IN VEHICLE SEAT

(75) Inventor: Hitoshi Ozawa, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 09/986,065

(22) Filed: Nov. 7, 2001

(65) Prior Publication Data

US 2003/0085604 A1 May 8, 2003

(51) Int. Cl.[7] .............................................. A47C 15/00
(52) U.S. Cl. ................ 297/238; 297/378.1; 297/411.32
(58) Field of Search ........................... 297/238, 411.32, 297/378.1

(56) References Cited

U.S. PATENT DOCUMENTS

| | | | | |
|---|---|---|---|---|
| 4,533,175 A | * | 8/1985 | Brennan | 297/113 |
| 4,662,674 A | * | 5/1987 | Shirai et al. | 297/113 |
| 5,246,272 A | * | 9/1993 | Kato et al. | 297/354.12 |
| 5,468,046 A | * | 11/1995 | Weber et al. | 297/216.11 |
| 5,540,479 A | * | 7/1996 | Thomas et al. | 297/113 |
| 5,639,144 A | * | 6/1997 | Naujokas | 297/216.11 |
| 5,685,612 A | * | 11/1997 | MacDonald et al. | 248/503.1 |
| 6,179,362 B1 | * | 1/2001 | Wisniewski et al. | 296/65.01 |

FOREIGN PATENT DOCUMENTS

| | | | | |
|---|---|---|---|---|
| DE | 3505399 A1 | * | 8/1986 | B60N/1/06 |
| JP | 2000-177459 | | 6/2000 | |

* cited by examiner

Primary Examiner—Peter M. Cuomo
Assistant Examiner—Stephanie Harris
(74) Attorney, Agent, or Firm—Browdy and Neimark, P.L.L.C.

(57) ABSTRACT

An arrangement for supporting a rotation adjustment mechanism of a rotary body in a vehicle seat, wherein the rotary body is supported between a bracket fixed to the seat and a hinge element having no rotation adjustment mechanism. A part of the bracket is provided within the rotary body and disposed substantially at a central vertical line of that particular rotary body. The rotation adjustment mechanism is attached on such part of the bracket, whereas on the other hand, the hinge element is disposed in one of two symmetrical lateral sides of the rotary body relative to the afore-said central vertical line. Hence, a load applied to the rotary body is mainly received by the bracket and escaped therethrough to the vehicle seat.

4 Claims, 1 Drawing Sheet

ARRANGEMENT FOR SUPPORTING ROTATION ADJUSTMENT MECHANISM OF ROTARY BODY IN VEHICLE SEAT

BACKGROUND OF INVENTION

1. Field of the Invention

The present invention relates to a rotary element or body rotatably provided between two seat backs of a split-type vehicle seat, such as a foldable center backrest rotatably interposed between the two seat backs, and a rotation adjustment mechanism for angular adjustment of the rotary body. In particular, the invention is directed to an arrangement for supporting such rotation adjustment mechanism and rotary body in the split-type seat.

2. Description of Prior Art

A split-type seat is widely used as a rear seat (e.g. a second seat or third seat) having a pair of independent seats combined together as one seat unit, wherein the two seats each comprises a seat back and a seat cushion (see FIG. 1), as opposed to a normal bench rear seat which only consists of one integral seat back and seat cushion unit. In this split-type of seat, a rotary element or body, such as a foldable center backrest, rotatable-type armrest, and the like, is pivoted between two seat backs in such a way to be rotatable forwardly and backwardly relative to the two seat cushions. Thus, such rotary body can be set in a horizontally extending position where it is in a generally parallel relation with the seat cushions and can be set in an upright position where it lies substantially flush with the seat backs.

For instance, as can be seen from FIG. 1 (not the prior art), there is known a splititype rear seat having a center backrest (at 12) rotatably provided between the two separate seat backs. In most cases, this center backrest is of a bilaterally supported type wherein its both lateral walls are rotatably supported by a pair of connecting elements, respectively. As typically disclosed from the Japanese Laid-Open Patent Publication No. 2000-177459, the bilaterally-supported-type center backrest has two centers of rotation at the respective two lateral walls thereof, with such an arrangement that a rotation adjustment mechanism is provided at one of the two rotation centers to permit angular adjustment of the center backrest relative thereto, while on the other hand, a rigid hinge bracket (i.e. a free hinge element without any rotation adjustment means) is provided at another of them to allow free rotation of the center backrest relative thereto. In that way, the center backrest per se is stably supported between the rotation adjustment mechanism and hinge bracket in the split-type vehicle seat, while permitting for its angular adjustment to attain a desired inclination angle for supporting the back of a passenger.

However, in the foregoing conventional arrangement, it is found that a large spacing is defined between the rotation adjustment mechanism and hinge bracket due to the fact that they are disposed on the two respective lateral walls of center backrest. This means, in a way, that a maximum distance is given between those two elements. Therefore, dynamically stated, a load applied to the center backrest is inevitably imparted as an intensive great load only to the rotation adjustment mechanism, which necessitates a reinforcement of the latter to withstand the intensive great load. In other words, it is necessary to compensate for the dynamical imbalance of load exertion between the hinge bracket and rotation adjustment mechanism so as to prevent undesired twisting or deformation of the center backrest. This reinforcement has been done, for example, by increasing the thickness of connecting parts of the rotation adjustment mechanism, adding a reinforcing bracket thereto, or providing various reinforcements to the frame of rotation adjustment mechanism.

Nevertheless, those reinforcements are found defective in increasing the weight of associated reinforced portions and reinforcement part, making the structure more intricate, and increasing the costs involved.

SUMMARY OF THE INVENTION

In view of the above-stated drawbacks, it is therefore a primary purpose of the present invention to provide an improved arrangement for supporting a rotation adjustment mechanism of a rotary body in a vehicle seat, which is light in weight with inexpensive costs while providing an optimal dynamical balance for supporting the rotary body and rotation adjustment mechanism.

To achieve such purpose, the arrangement for supporting a rotation adjustment mechanism of a rotary body in a vehicle seat, in accordance with the present invention, basically comprises:

- a bracket fixed to the vehicle seat, which is so adapted that the rotation adjustment means is rotatably supported thereon;
- the bracket being provided within the rotary body such as to be disposed substantially at a central vertical line of the rotary body;
- a hinge means without any rotation adjustment means provided therewith, which is so adapted that the rotary body is hingedly, rotatably supported thereon; and
- the hinge means being disposed at one of two symmetrical lateral sides of the rotary body in relation to the afore-said central vertical line.

Accordingly, the bracket is situated centrally of and within the rotary body to provide a maximum strength sufficient to directly receive a great load applied to either of front and rear surfaces of the rotary body, thereby avoiding exertion of the load on the hinge means and eliminating a dynamical imbalance between the rotation adjustment mechanism and the hinge means as found in the prior art. Therefore, it is possible to positively prevent any twisting deformation of the rotary body, and also, the bracket requires no reinforcement, contributing to reduction of weight and costs involved.

Additionally, the rotary body remains stably supported at its both lateral sides between the bracket and hinge means, just in the same way as the ordinary bilaterally-supported structure stated previously.

Preferably, the bracket may be generally of a plate-like structure having a substantially planar both side walls and so disposed as to orient such both planar side walls in a direction to the central vertical line of rotary body, thus extending in a direction orthogonal with a widthwise direction of the rotary body. Further, such plate-like bracket be fixedly connected with a seat cushion of the vehicle seat, Hence, the bracket is not only easily given a rigidity enough to receive most of the great load without any reinforcement thereto, but also effectively escapes and disperses most of the great load through its wide planar wall down to the vehicle floor.

Other various features and advantages will become apparent from reading of the descriptions hereinafter, with reference to the annexed drawings.

DETAILED DESCRIPTION OF PREFERRED EMBODIMENT OF THE PRESENT INVENTION

Figure 1:
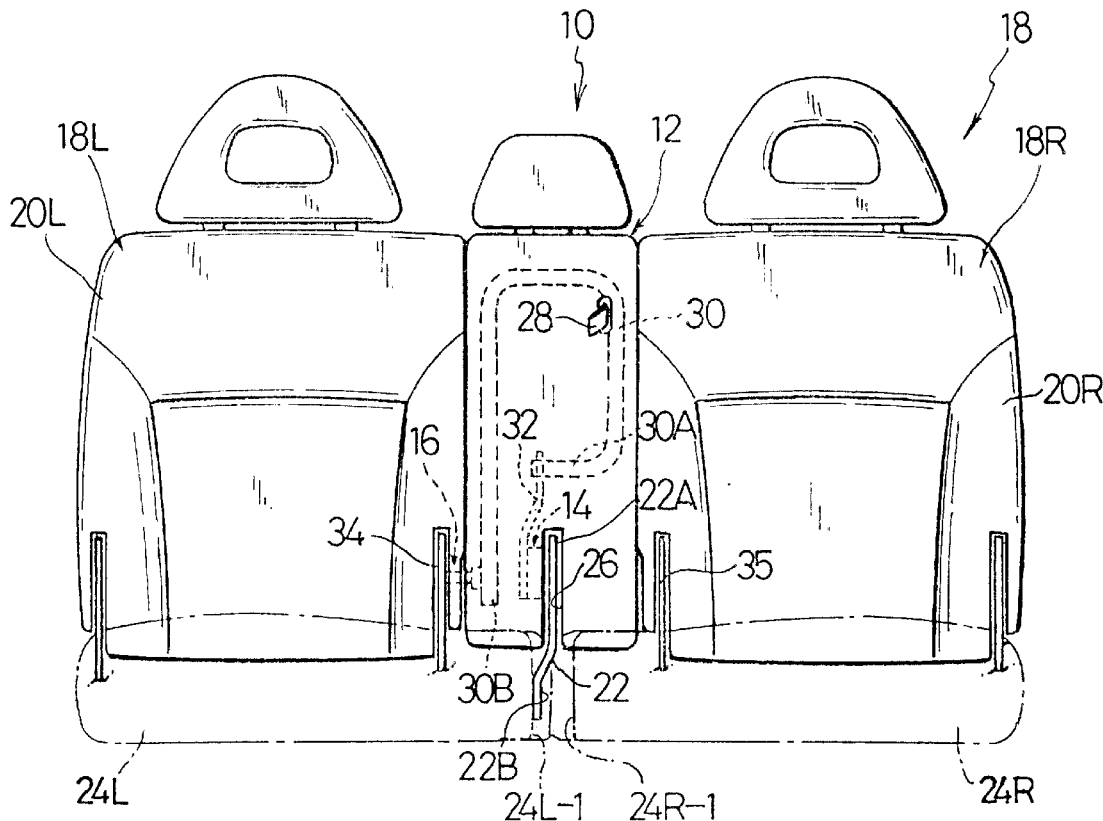
FIG. 1 is a schematic front view of split-type vehicle seat having a foldable center backrest as a rotary body provided therein, to which the present invention is applied.
Figure 2:
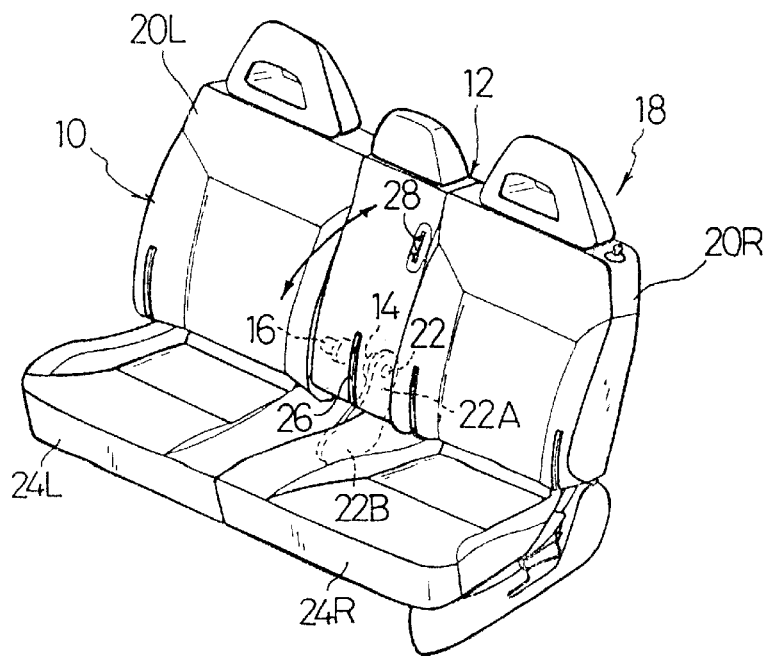
FIG. 2 is a schematic perspective view of the split-type vehicle seat shown in the FIG. 1.

Referring to FIGS. 1 and 2, there is illustrated a preferred mode of arrangement in the present invention, which is effective in supporting a rotation adjustment mechanism of a rotary body in a vehicle seat. As described earlier, the rotary body refers to any kind of seat component or accessory which is rotatably provided in a vehicle seat, including a foldable center backrest, a fold-down center console, a rotatable-type armrest and so forth, whereas with regard to the rotation adjustment mechanism, it refers to a mechanism for allowing such rotary body to be adjustably rotated at a desired angle of inclination in a vehicle seat. In the illustrated embodiment, a foldable center backrest (12) (or the so-called "sub seat" or "folding sub seat") is shown as the rotary body, by way of example, which is rotatably incorporated in the center of a split-type vehicle seat designated generally by (18).

As is known, the split-type vehicle seat (18) is formed by a pair of separate right and left seat components (18R) (18L), as one seat unit, as viewed from FIG. 1. The right seat component (18R) comprises a seat cushion (24R) and a seat back (20R), and likewise, the left seat component (18L) comprises a seat cushion (24L) and a seat back (20L). The foldable center backrest (12) is provided in a space between those two seat backs (20R) (20L) of the split-type vehicle seat (18).

The foldable center backrest (12) itself is basically of a bilaterally supported structure, as noted previously, wherein both lateral sides thereof are supported by a rotation adjustment mechanism and a free hinge means without rotation adjustment mechanism, respectively. The center backrest (12) is foldable forwardly and backwardly relative to the seat (18) as indicated by the arrow in FIG. 2, such that the backrest can be set in an upright use position substantially flush with both two seat backs (20R) (20L) to support the back of a passenger, and also can be set in a horizontally extending position where the backrest (12) is folded onto both two seat cushions (24R) (24L). Although not shown, in that horizontally extending position, the center backrest (12) is in a reversed state, with its rear wall exposed outwardly, and therefore may be used as an armrest with drink bottle holders on that rear wall thereof. Both split-type seat (18) and center backrest (12) are well known in the art, and any further description is omitted thereon.

In accordance with the present invention, referring again to FIGS. 1 and 2, a generally V-shaped support bracket (22) is disposed centrally within the center backrest (12), which has a lower base portion (22B) securely attached to a lateral wall or a side frame of the left-side seat cushion (24L). Of course, the lower base portion (22B) may be attached to a lateral wall or a side frame of the right-side seat cushion (24R). The support bracket (22) also has an upper end portion (22A) on which is fixedly provided a rotation adjustment mechanism (14) for allowing the center backrest (12) to be adjustably rotated at a desired inclination angle. While not shown clearly, the rotation adjustment mechanism (14) is a known mechanism which has a stationary base area fixed to the upper end portion (22A) of support bracket (22) and a rotary area fixed to a connecting arm (32) to be described later, wherein the rotary area allows the center backrest (12) to be rotated about a center of rotation in the mechanism (14), and is provided with a lock mechanism by which the center backrest (12) can be locked at a certain angle of inclination and unlocked therefrom to another angle of inclination, as desired. As this is known in the art, any further explanation is omitted.

Designation (26) denotes a vertical slit formed in the center backrest (12), which allows the center backrest (12) per se to be smoothly rotatable therethrough relative to the support bracket upper end portion (22A) (i.e. a center of rotation of the rotation adjustment mechanism (14)). As shown, the slit (26) extends vertically from the bottom of the center backrest (12) along the central line of the same up to a certain level, the central line being aligned with the boundary between the two seat cushions (24L) (24R), and also the slit (26) has a depth communicating with the inside hollow of the center backrest (12). With this structure, the upper half of support bracket (22) is inserted through the slit (26) and placed within the center backrest (12) for connection with the rotation adjustment mechanism (14), while the lower half of support bracket (22) is disposed between the two seat cushions (24L) (24R) such that the lower end (22B) of support bracket (22) is fixedly secured to one of the two seat cushions (24L) (24R).

As indicated by the dashed line in FIG. 1, the center backrest (12) is provided with a main frame (30) therewithin. The illustrated main frame (30) has a horizontal end portion (30A) situated above the support bracket (22) and a vertical end portion (30B) expending vertically to a point in the vicinity of a support bracket (34) associated with the left-side seat back (20L). The horizontal end portion (30A) of main frame (30) is connected with the rotation adjustment mechanism (14) via a connecting arm (32) which forms a part of the main frame (30). On the other hand, the vertical end portion (30B) of main frame (30) has a hinge pin (16) firmly attached thereto. This hinge pin (16) projects outwardly from the vertical end portion (30B) and is pivotally connected with the support bracket (34) of left-side seat back (20L). In that manner, the aforementioned free hinge means without rotation adjustment mechanism is embodied as far as the present embodiment is concerned. Of course, this is not imitative, but, any other suitable hinge structure may be employed as such free hinge means. For instance, a hinge bracket may be provided in the center backrest (12) for pivotal connection with the support bracket (34).

Designation (28) denotes an unlocking strap extending outwardly from the center backrest (12). While not shown, the unlocking strap (28) is operatively connected with the rotation adjustment mechanism (14) such that drawing the strap (28) forwardly places the mechanism (14) in an unlocked state to permit free rotation of the center backrest (12) and, conversely, releasing the strap (28) causes the mechanism (14) to be in a locked state, whereby a passenger can adjustably set an inclination angle of the center backrest (12). As this is not the subject matter of the present invention, any further description thereon is omitted.

From the descriptions above, it is appreciated that the present invention has the following effects and advantages:

(i) The support bracket (22) is situated centrally of and within the center backrest (12), such that both planar lateral sides thereof are oriented in a direction to the central vertical line of the rotary body or the center backrest (12), thus extending lengthwise along the fore-and-aft direction of the seat (18). In other words, both planar lateral sides of the support bracket (22) extend in a direction orthogonal with the widthwise direction of center backrest (12) per se which expands in the widthwise direction of the seat (18). Such disposition of support bracket (22) simply provides a maximum strength sufficient to directly receive a great load applied in the fore-and-aft direction of seat (18) to either of front and rear walls of the center backrest (12) and effectively disperses the great load in the widely expanding lateral sides of support bracket (22). This means that the load is absorbed and escaped through the support bracket (22) as well as the seat cushion (24L or 24R) down to a vehicle floor (not shown) because of the bracket (22) being securely fastened to the seat cushion (24L or 24) which is fixed on the vehicle floor. Hence, the support bracket (22) requires no reinforcement as in the prior art and the load is not imparted to the hinge element (at 16). In other words, the rotary body or center backrest (12) is stably supported between the bracket (22) and hinge element (at 16) against twisting deformation found in the prior art even when a great load is applied to either of forward and backward sides of the center backrest (12).

(ii) Moreover, the support bracket (22) is of a simple plate-like structure which extends generally in the vertical direction and therefore realizes its reduced weight as opposed to normal complicated brackets. Also, because of its being arranged at the central line of center backrest (12), the support bracket (22) per se can be directly, easily attached to either of the two seat cushions (24L) (24R) at a small number of fastening points, thus effectively simplifying the whole structure of center backrest (12) without need for any typical U-shaped or otherwise complicated support bracket that tends to increase its weight and has plural fastening points and plural fastening elements.

(iii) Furthermore, in addition to being supported by the bracket (22), the center backrest (12) is also rotatably supported by the hinge element (at 16) rotatably connected with another bracket (34 or 35) associated adjacent seat back (20L or 20R), which therefore inherently retains the hitherto bilaterally-supported structure wherein both lateral sides of the center backrest (12) are supported by the support bracket (22) and hinge element (at 16), respectively, thereby to insure a stable rotation of a rotation body or the center backrest (12). Yet further, the simple structure of hinge element or one hinge pin (16) can be simply connected with the adjacent seat back (20L or 20R), thus eliminating the need for any complicated structure of support bracket as found in a typical U-shaped bracket or the like.

Finally, it should be understood that the present invention is not limited to the illustrated embodiment, but any other modifications, replacements and additions May be structurally applied thereto without departing from the scopes of the appended claims. For example, the above-described center backrest (12) is not imitative as the rotary body defined in the present invention, but it may be a rotatable-type armrest, a rotatable-type child seat that can be rotated upwardly and stored in between the two seat backs, or the like. The present invention may also be applied to any other kinds of seats usable in a train, aircraft or vessel.

What is claimed is:

1. In a vehicle seat comprising a pair of separate seat components each having a seat back and a seat cushion, a center backrest rotatably provided between the seat backs, said center backrest having symmetrical lateral sides, and a rotation adjustment means for allowing rotatable adjustment of said center backrest, an arrangement for supporting said rotation adjustment means, comprising:

a bracket having a first portion on which said rotation adjustment means is rotatably supported; and a second portion fixedly connected with one of said seat cushions, wherein said first portion is provided within said center backrest substantially at a central vertical line of the center backrest;

a hinge means spaced apart from the rotation adjustment means with said center backrest being hingedly, rotatably supported thereon; and said hinge means being disposed at one of said symmetrical lateral sides of the center backrest in relation to said central vertical line and being pivotally connected with one of said seat backs.

2. The arrangement according to claim 1, wherein said hinge means comprises a hinge pin projecting outwardly from said one of said symmetrical lateral sides of said center backrest, said hinge pin being rotatably engaged with one of said seat backs.

3. The arrangement according to claim 1, wherein said bracket is formed from plate material having two substantially planar side walls, and said bracket being oriented to said two substantially planar side walls in a direction parallel to that of said central vertical line of said center backrest and extending in a direction orthogonal with a widthwise direction of said center backrest.

4. The arrangement according to claim 1, wherein said second portion of said bracket extends between said seat cushions and is fixedly connected with one of said seat cushions, wherein said hinge means comprises a hinge pin projecting outwardly from said one of the symmetrical lateral sides of said center backrest, and wherein said hinge pin is rotatably engaged with one of said seat backs.

* * * * *